(12) United States Patent
Meggiolan et al.

(10) Patent No.: US 8,668,278 B2
(45) Date of Patent: Mar. 11, 2014

(54) RIM FOR A BICYCLE WHEEL AND BICYCLE WHEEL COMPRISING SUCH A RIM

(75) Inventors: Mario Meggiolan, Creazzo (IT); Paolo Saccardo, Schio (IT)

(73) Assignee: Campagnolo S.r.l., Vicenza (IT)

( * ) Notice: Subject to any disclaimer, the term of this patent is extended or adjusted under 35 U.S.C. 154(b) by 489 days.

(21) Appl. No.: 12/268,012

(22) Filed: Nov. 10, 2008

(65) Prior Publication Data

US 2009/0134693 A1 May 28, 2009

(30) Foreign Application Priority Data

Nov. 26, 2007 (IT) .............................. MI2007A2231

(51) Int. Cl.
*B60B 21/02* (2006.01)
(52) U.S. Cl.
USPC .................... 301/95.104; 301/55; 301/95.101
(58) Field of Classification Search
USPC ........... 301/5.24, 58, 95.101, 95.104, 95.105, 301/95.106, 95.107, 95.108; 152/427, 428
See application file for complete search history.

(56) References Cited

U.S. PATENT DOCUMENTS

| | | | |
|---|---|---|---|
| 395,523 A | 1/1889 | Taylor | |
| 401,551 A | 4/1889 | Gilles | |
| 452,649 A | 5/1891 | Powell | |
| 521,385 A | 6/1894 | Mosley | |
| 531,914 A | 1/1895 | Donnelly | |
| 677,319 A | 6/1901 | McConville | |
| 707,335 A | 8/1902 | Kenyon | |
| 759,124 A | 5/1904 | Oswald | |
| 1,286,065 A | 11/1918 | Murray | |
| 1,377,173 A | 5/1921 | Allen | |
| 1,393,797 A | 10/1921 | Lachman | |
| 1,402,003 A | 1/1922 | Miller | |
| RE15,366 E | 5/1922 | Dressel | |
| 1,467,588 A * | 9/1923 | Prescott et al. | ............... 301/35.3 |

(Continued)

FOREIGN PATENT DOCUMENTS

| | | |
|---|---|---|
| BE | 398573 | 10/1933 |
| CH | 179922 | 9/1935 |

(Continued)

OTHER PUBLICATIONS

Campagnolo Products Catalogue 2005, pp. 92-97.

(Continued)

*Primary Examiner* — Jason Bellinger
(74) *Attorney, Agent, or Firm* — Volpe and Koenig, P.C.

(57) ABSTRACT

A rim (5) for a bicycle wheel having a body (20) with a substantially annular extension with a radially outer portion (22) shaped for coupling with a tire is disclosed. The radially outer portion (22) has a hole (39) for an inflation valve. The radially outer portion (22) also includes, at the hole (39) and/or in an area proximal to the hole (39), at least one cross section having a different shape from that at an area distal from the hole, so as to form at least one second surface discontinuity (35) along the annular extension of the radially outer portion (22). The second discontinuity (35) makes it easier to assemble to wheel and allows an optimal coupling to be made between the rim (5), inflation valve, and tire, in the case of a tubeless wheel, and between rim (5), air chamber and tire, in the case of a wheel with an air chamber.

43 Claims, 11 Drawing Sheets

(56) References Cited

U.S. PATENT DOCUMENTS

| | | | |
|---|---|---|---|
| 1,484,844 A | 2/1924 | Ollie | |
| 1,542,630 A | 6/1925 | Meredith | |
| 1,667,344 A | 4/1928 | Couture | |
| 1,684,290 A | 9/1928 | Starling | |
| 1,689,649 A * | 10/1928 | Wagenhorst | 152/428 |
| 1,833,879 A | 11/1931 | Ash | |
| 1,847,774 A | 3/1932 | Main et al. | |
| 1,889,577 A | 11/1932 | Milton | |
| 2,840,133 A | 6/1958 | Billingsley | |
| 2,937,905 A | 5/1960 | Altenburger | |
| 3,253,862 A | 5/1966 | Watanbe et al. | |
| 3,758,931 A | 9/1973 | Patterson | |
| 4,040,671 A | 8/1977 | Hersh | |
| 4,146,274 A | 3/1979 | Lejeune | |
| 4,153,267 A | 5/1979 | Hilber | |
| 4,173,992 A | 11/1979 | Lejeune | |
| 4,181,365 A | 1/1980 | Kawaguchi et al. | |
| 4,376,749 A | 3/1983 | Woelfel | |
| 4,527,839 A | 7/1985 | Fujitaka et al. | |
| 4,564,056 A * | 1/1986 | Doring | 152/427 |
| 4,574,446 A | 3/1986 | Kaufeldt et al. | |
| 4,614,678 A | 9/1986 | Ganga | |
| 4,702,527 A | 10/1987 | Kawano | |
| 4,749,235 A | 6/1988 | McDougall | |
| 4,832,414 A | 5/1989 | Jones | |
| 4,909,576 A | 3/1990 | Zampieri | |
| 4,983,430 A | 1/1991 | Sargent | |
| 5,073,315 A | 12/1991 | Bertelson | |
| 5,215,137 A * | 6/1993 | Weeks et al. | 152/379.4 |
| 5,271,663 A | 12/1993 | Maldini et al. | |
| 5,512,119 A | 4/1996 | Takezawa et al. | |
| 5,522,630 A | 6/1996 | James | |
| 5,534,203 A | 7/1996 | Nelson et al. | |
| 5,540,485 A | 7/1996 | Enders | |
| 5,549,360 A | 8/1996 | Lipeles | |
| 5,603,553 A | 2/1997 | Klieber et al. | |
| 5,653,510 A | 8/1997 | Osborne | |
| 5,919,044 A | 7/1999 | Sicurelli, Jr. et al. | |
| 5,960,834 A | 10/1999 | Sekido et al. | |
| 5,975,646 A | 11/1999 | Campagnolo | |
| 6,024,413 A | 2/2000 | Dixon et al. | |
| 6,036,279 A | 3/2000 | Campagnolo | |
| 6,048,035 A | 4/2000 | Chen | |
| 6,086,161 A | 7/2000 | Luttgeharm et al. | |
| 6,089,672 A | 7/2000 | Chen | |
| 6,126,243 A | 10/2000 | Okajima et al. | |
| 6,155,651 A | 12/2000 | Mizata et al. | |
| 6,183,047 B1 | 2/2001 | Kuhl | |
| 6,190,481 B1 | 2/2001 | Iida et al. | |
| 6,196,638 B1 | 3/2001 | Mizuno et al. | |
| 6,228,474 B1 | 5/2001 | Kishi et al. | |
| 6,237,662 B1 | 5/2001 | Thomasberg | |
| 6,257,676 B1 | 7/2001 | Lacombe et al. | |
| 6,318,428 B1 | 11/2001 | Lo | |
| 6,347,839 B1 | 2/2002 | Lew et al. | |
| 6,367,883 B1 | 4/2002 | Chen | |
| 6,378,953 B2 | 4/2002 | Mercat et al. | |
| 6,402,256 B1 | 6/2002 | Mercat | |
| 6,425,641 B1 | 7/2002 | Herting | |
| 6,428,115 B1 | 8/2002 | Chen | |
| 6,443,533 B2 * | 9/2002 | Lacombe et al. | 301/95.104 |
| 6,450,226 B2 * | 9/2002 | DeLacroix et al. | 152/427 |
| 6,536,849 B1 | 3/2003 | Okajima et al. | |
| 6,557,946 B1 | 5/2003 | Gerrit et al. | |
| 6,588,474 B2 * | 7/2003 | Passarotto | 152/427 |
| 6,593,255 B1 | 7/2003 | Lawton et al. | |
| 6,672,352 B2 * | 1/2004 | Yamagiwa et al. | 152/506 |
| 6,761,847 B2 | 7/2004 | Meggiolan | |
| 6,783,192 B2 | 8/2004 | Meggiolan | |
| 6,926,370 B2 | 8/2005 | Spoelstra | |
| 6,938,962 B1 | 9/2005 | Schlanger | |
| 6,957,926 B2 | 10/2005 | Okuda | |
| 6,991,300 B2 | 1/2006 | Colegrove | |
| 7,032,769 B2 | 4/2006 | Iida et al. | |
| 7,090,307 B2 | 8/2006 | Okajima | |
| 7,104,300 B2 | 9/2006 | Veux et al. | |
| 7,431,404 B2 | 10/2008 | Senoo | |
| 7,448,696 B2 * | 11/2008 | Meggiolan et al. | 301/58 |
| 7,487,811 B2 | 2/2009 | Schelhaas | |
| 2001/0005913 A1 | 7/2001 | Elsener et al. | |
| 2001/0019222 A1 | 9/2001 | Campagnolo | |
| 2002/0066316 A1 | 6/2002 | Kashiwai et al. | |
| 2002/0067066 A1 | 6/2002 | Kashiwai et al. | |
| 2002/0108249 A1 | 8/2002 | Meggiolan | |
| 2004/0095014 A1 | 5/2004 | Veux et al. | |
| 2004/0139609 A1 | 7/2004 | Meggiolan et al. | |
| 2005/0017569 A1 | 1/2005 | Passarotto | |
| 2005/0189813 A1 | 9/2005 | Bauer | |
| 2005/0210675 A1 | 9/2005 | Price et al. | |
| 2005/0253446 A1 | 11/2005 | Okajima | |
| 2006/0043784 A1 | 3/2006 | Passarotto | |
| 2006/0181140 A1 | 8/2006 | Mercat et al. | |
| 2006/0200989 A1 | 9/2006 | Possarnig et al. | |
| 2007/0063577 A1 | 3/2007 | Passarotto | |
| 2007/0158996 A1 | 7/2007 | Meggiolan | |
| 2009/0134693 A1 | 5/2009 | Meggiolan | |
| 2009/0134695 A1 | 5/2009 | Meggiolan | |
| 2009/0250994 A1 | 10/2009 | Meggiolan | |
| 2010/0013119 A1 | 1/2010 | Meggiolan | |
| 2011/0127827 A1 * | 6/2011 | Andrews | 301/95.101 |

FOREIGN PATENT DOCUMENTS

| | | |
|---|---|---|
| CH | 218795 | 12/1941 |
| CN | 2709212 | 7/2005 |
| DE | 4127500 C1 | 10/1992 |
| DE | 4425592 A1 | 1/1996 |
| DE | 4444044 A1 | 6/1996 |
| DE | 102004055892 | 5/2006 |
| DE | 102006029468 | 8/2007 |
| EP | 0154666 | 9/1985 |
| EP | 0324630 A2 | 7/1989 |
| EP | 0579525 | 1/1994 |
| EP | 0615865 | 9/1994 |
| EP | 0715001 | 6/1996 |
| EP | 0893280 | 1/1999 |
| EP | 0896886 A1 | 1/1999 |
| EP | 1084868 A1 | 3/2001 |
| EP | 1101631 A1 | 5/2001 |
| EP | 0936085 A3 | 10/2001 |
| EP | 1167078 A1 | 1/2002 |
| EP | 1231077 A2 | 8/2002 |
| EP | 1314579 A2 | 5/2003 |
| EP | 1314579 A3 | 5/2003 |
| EP | 1479533 | 11/2004 |
| FR | 657185 | 5/1929 |
| FR | 833629 | 6/1937 |
| FR | 2474403 | 7/1981 |
| FR | 2765150 | 6/1997 |
| GB | 281229 | 5/1928 |
| GB | 913967 | 12/1962 |
| GB | 2009662 | 6/1979 |
| JP | 33006601 | 5/1933 |
| JP | 5553632 | 10/1953 |
| JP | 56102201 | 1/1955 |
| JP | 329153 | 7/1955 |
| JP | 49042132 | 11/1974 |
| JP | 5125421 | 6/1976 |
| JP | S54076004 | 11/1977 |
| JP | 57091603 | 6/1982 |
| JP | 60080902 | 10/1983 |
| JP | 58191601 | 11/1983 |
| JP | 59193702 | 12/1984 |
| JP | 60012315 A | 1/1985 |
| JP | 60157901 | 8/1985 |
| JP | 60275078 | 9/1985 |
| JP | 61118801 | 7/1986 |
| JP | 61175005 | 10/1986 |
| JP | 62119639 | 5/1987 |
| JP | 62275801 A | 11/1987 |
| JP | 63031802 | 2/1988 |
| JP | 01226401 | 9/1989 |
| JP | 04306101 | 10/1992 |
| JP | 07117423 | 5/1995 |

(56) References Cited

FOREIGN PATENT DOCUMENTS

| JP | 08207503 | 8/1996 |
|---|---|---|
| JP | 3025849 | 10/1996 |
| JP | 2002166702 | 11/2002 |
| JP | 2003094902 | 4/2003 |
| JP | 2003098027 | 4/2003 |
| JP | 2003260901 | 9/2003 |
| JP | 200372301 | 12/2003 |
| JP | 2005319962 A | 11/2005 |
| RU | 2096188 C1 | 7/1996 |
| TW | 445221 B | 7/2001 |
| TW | 465464 U | 11/2001 |
| TW | 497556 | 8/2002 |
| TW | 505113 | 10/2002 |
| TW | M252568 U | 12/2004 |
| WO | 9309963 | 11/1992 |
| WO | 9309963 | 5/1993 |
| WO | 0232695 | 4/2002 |
| WO | 0240295 | 5/2002 |
| WO | 2007027927 | 3/2007 |

OTHER PUBLICATIONS

European Search Report—EP 08425161.0-2421—dated Aug. 18, 2008.
European Search Report—EP 08006140.1—dated Mar. 25, 2009.
European Search Report—EP 08006139.3-2421—dated Apr. 6, 2009.
Extended European Search Report—Application No. 08006139.3-2421—dated Jul. 30, 2009.
European Search Report, Application No. 08006140.1, dated Mar. 25, 2009.
Japanese Office Action issued Jul. 2, 2013 and English Translation, in corresponding Japanese Application No. 2008-299357.
English Translation of Taiwanese Office Action and Search Report issued Sep. 16, 2013 in corresponding TW Application No. 097143705.
English translation of Office Action for Japanese Patent Appln. No. 2004-329603—dated Dec. 8, 2009.
English translation of Office Action for Japanese Patent Appln. No. 2005-251583—dated Jul. 13, 2010.
English translation of Office Action issued in corresponding Taiwanese Appln. 094129965—dated Apr. 20, 2011.
Japanese Office Action for Japanese Patent Appln. No. 2005-251583—dated May 10, 2011.
English translation of Office Action for Japanese Patent Appln. No. 2005-251583—dated May 10, 2011.
Chinese Office Action for Chinese Patent Appln. No. 200810177972.2—dated May 18, 2011.
English translation of Office Action for Chinese Patent Appln. No. 200810177972.2—dated May 18, 2011.

* cited by examiner

RIM FOR A BICYCLE WHEEL AND BICYCLE WHEEL COMPRISING SUCH A RIM

FIELD OF INVENTION

The following description relates to a rim for a bicycle wheel.

The description also relates to a bicycle wheel comprising such a rim, and a bicycle comprising such a wheel. Preferably, the bicycle is a racing bicycle.

The description also relates to a method for manufacturing the rim for a bicycle wheel.

BACKGROUND

Typically, a bicycle wheel includes a rim, on which a tire, a hub, and a plurality of spokes extending between the rim and the hub are mounted.

Between the rim and the tire, an air chamber can be inserted which, once inflated through a suitable inflation valve, brings the tire into the desired operative configuration. The inflation valve is typically associated with a thickened portion of the air chamber.

Amongst the various types of bicycle wheels, use of the type known as "tubeless," i.e. without an air chamber, is now widespread. In tubeless wheels, the tire is mounted airtight on the rim, so as to form an airtight annular area in which pressurized air is introduced through an inflation valve associated with the rim at a suitable hole formed in the rim.

The airtight annular area of tubeless wheels is defined by an inner surface of the tire and an outer surface of the rim. In particular, the rim comprises a radially outer portion provided with an annular bottom wall, or upper bridge, and with a pair of annular side walls, or fins, extending radially outwards from the upper bridge; such fins hold the tire, in a final assembled configuration, against the thrust of the pressurized air, achieving an airtight coupling between tire and rim.

The outer surface of the rim that defines the airtight annular area is therefore defined by the radially outer surface of the upper bridge of the rim and the axially inner surfaces of the fins.

The hole for the inflation valve is formed in the upper bridge of the rim. The upper bridge has no further holes. In particular, there are no holes for the assembly of the spokes of the wheel; such holes are instead generally provided in a radially inner portion of the rim. In those cases in which the holes for the assembly of the spokes are formed in the upper bridge of the rim, they are suitably sealed, for example through a rubber band.

The inflation valve includes a stem adapted to pass through the hole formed in the upper bridge of the rim, and a head which is widened with respect to the stem. The head is typically made from elastic material.

The head of the inflation valve is adapted to abut the radially outer surface of the upper bridge of the rim so as to prevent the stem from slipping out from the hole in a radially inward direction with respect to the rim. A ring nut is screwed onto the stem and abuts a radially inner surface of the rim, so as to keep the stem from slipping in the radially outward direction with respect to the rim. In addition, the screwing of the ring nut allows the head made from elastic material to be kept in abutment with a surface portion around the hole in which the stem is inserted, achieving the desired seal against the leakage of air from the hole.

In a significant number of tubeless wheels of the type described above there are problems of deflation; on the other hand, other absolutely identical wheels do not have this problem.

In order to repair the tubeless wheel it is necessary to replace the tire. However, it is not very practical for a cyclist to transport spare tires. For this reason, the cyclist generally prefers, in the case of a puncture to the tire, to insert an air chamber between rim and tire, thus transforming the tubeless wheel into a normal wheel with an air chamber.

The presence of the air chamber, however, has the same drawback already present in normal wheels with an air chamber, i.e. the need to establish an optimal coupling between rim, air chamber and tire. Such an optimal coupling is difficult to achieve in practice, for which reason all wheels provided with an air chamber (both the tubeless ones in which the air chamber is inserted following a puncture and the normal ones that are provided with the air chamber from the beginning), in practice, have a operating efficiency lower than that of the tubeless wheels without an air chamber.

SUMMARY

The description relates to a rim for a bicycle wheel having a radially outer upper bridge that defines seats for two beads of a tubeless tire. The rim comprises a recess with a hole formed therein that houses an inflation valve.

The description also relates to a wheel and a bicycle comprising such a rim.

The description also relates to a method for producing a rim. According to the method, a tubular body having an opened end and a radially outer wall is provided. Also provided are insert sized and shaped for insertion into the opened end of the body and defining a recess on an outer surface corresponding to the radially outer wall, and a punch having a projection with an outer profile matching that of the recess. The insert is inserted into the opened end of the tubular body such that the recess contacts an inner surface of the radially outer wall, and the projection of the punch is forced against an outer surface of the radially outer wall directly opposite the area contacted by the recess.

DETAILED DESCRIPTION OF THE PREFERRED EMBODIMENT(S)

Introduction to the Embodiments

Figure 1:
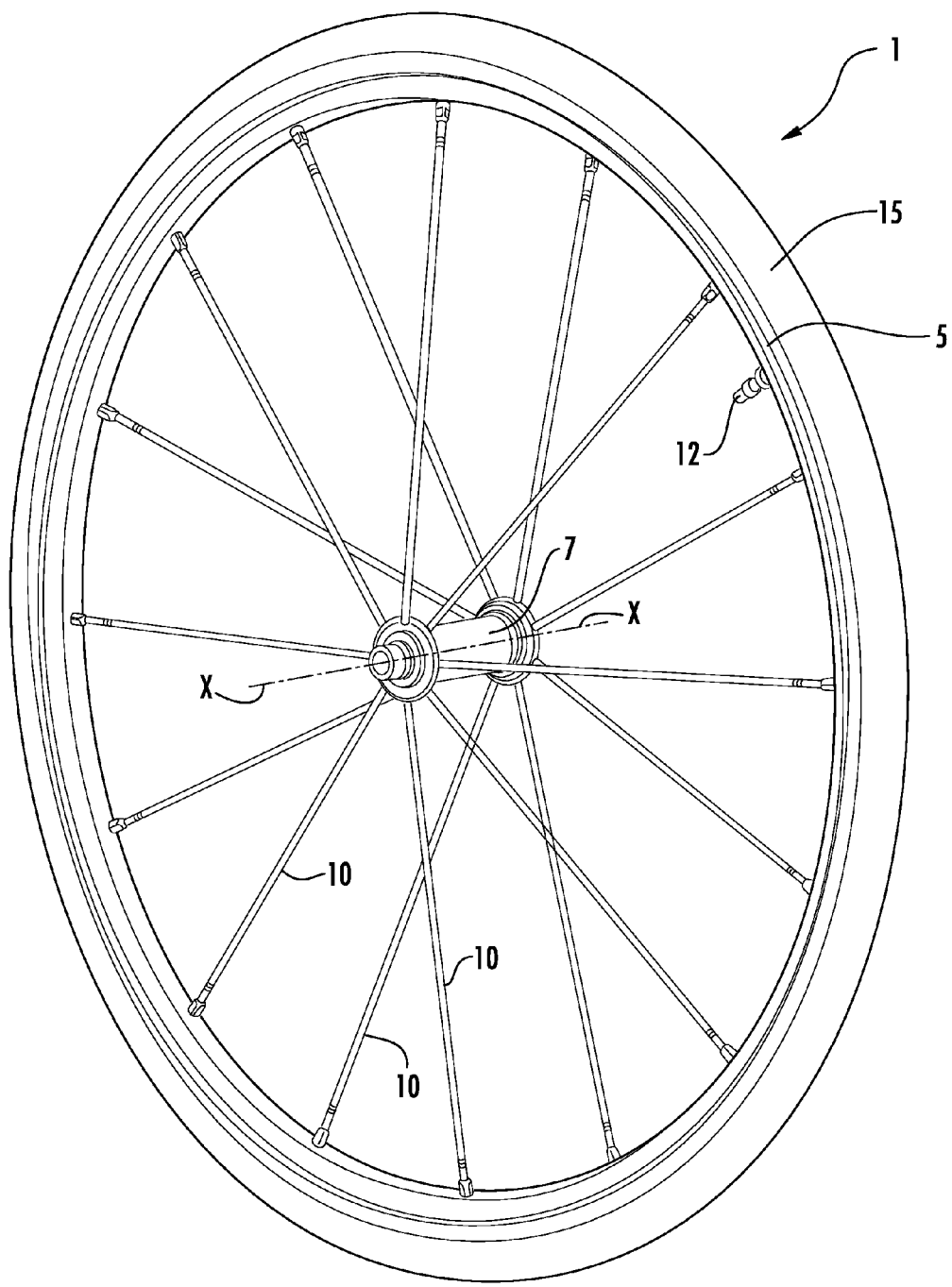
FIG. 1 schematically shows a perspective view of a first embodiment of a bicycle wheel.

The present description, in a first aspect thereof, relates to a rim for a bicycle wheel comprising a body with a substantially annular extension, the rim having a radially outer portion shaped for coupling with a tire, the radially outer portion comprising a hole for an inflation valve, the hole constituting a first surface discontinuity along the annular extension of the radially outer portion. The radially outer portion comprises, at the hole and/or in an area proximal to the hole, at least one cross section having a different shape to that at an area distal from the hole, so as to form at least one second surface discontinuity along the annular extension of the radially outer portion.

The provision in the rim of a second surface discontinuity at the hole for the inflation valve and/or near such a hole makes it easier to assemble the wheel, and allows an optimal coupling to be made between the rim and inflation valve.

In the case of a tubeless wheel, the second surface discontinuity allows the inflation valve to be kept in a desired position during insertion into the respective hole suitably provided in the rim. In this way, the correct assembly of the inflation valve on the rim is ensured, irrespective of the ability of the operator that performs the assembly. The second discontinuity prevents the valve from rotating or spinning about its own longitudinal axis during the locking thereof with respect to the rim, thus preventing the valve from positioning itself in a way that would interfere with the desired airtight seal at the respective hole.

This is particularly useful where valves are used in which the locking of the valve on the rim takes place by means of a ring nut screwed onto the stem of the valve and in abutment against a radially inner surface of the rim. In this case, the screwing of the ring nut could cause the rotation of the head of the valve. The second discontinuity prevents such rotation.

In order to simplify as much as possible the manufacturing steps of the rim, the radially outer portion preferably has the same cross section along the entire annular extension of the rim, apart from at the hole and/or the area proximal to the hole.

Preferably, the radially outer portion of the rim comprises an annular bottom wall extending in the axial direction and a pair of opposite annular side walls extending radially outwards from the bottom wall, the side walls comprising means for holding respective radially inner end edges of the tire.

Throughout the present description and in the subsequent claims, the "annular side walls" of the radially outer portion of the rim shall also be referred to as "fins," and the "bottom wall" shall also be referred to as the "upper bridge."

Preferably, the bottom wall comprises a central annular portion and two opposite side annular portions, the central annular portion being lowered with respect to the opposite side annular portions.

The rim, in a first embodiment thereof, is a rim for a tubeless wheel and the second surface discontinuity is adapted to prevent the rotation of the inflation valve about its own longitudinal axis when the inflation valve is mounted on the rim.

In a second embodiment thereof, the rim is a rim for a wheel provided with an air chamber and the second surface discontinuity is adapted to come into contact with a thickened portion of the air chamber with which the inflation valve is associated when the inflation valve is inserted in the hole.

In both of the aforementioned embodiments, as stated, simplicity of assembly and an optimal coupling of the components of the respective wheel, tubeless or with an air chamber, is achieved.

In the case of a rim for a tubeless wheel, the second surface discontinuity preferably comprises an abutment surface for a side surface of the inflation valve, when the valve is mounted on the rim. More preferably, the abutment surface is a substantially flat surface. In this way, inflation valves already available on the market can be used.

Preferably, the abutment surface extends radially outwards from the bottom wall between the side walls. Even more preferably, the abutment surface extends perpendicularly to the side walls. However, it is possible to foresee different orientations for the aforementioned abutment surface.

In a preferred embodiment of the rim, the bottom wall comprises, at the hole for the inflation valve, a recess. Preferably, the recess is defined in the lowered central annular portion, when provided. Even more preferably, the abutment surface is defined by a side wall of the recess.

Due to the provision of the recess, in the case of tubeless wheels, the head of the inflation valve can be housed therein, thus occupying little space in the radial direction. In this way, the head of the valve is prevented from hindering the assembly of the tire on the rim.

In the case of tubeless wheels, it is necessary to provide an airtight seal between tire and rim, even during the initial inflation steps of the tire. In the presently disclosed rim, this requirement is achieved as a result of the provision of the recess and the housing of the head of the valve in the recess.

In the case of wheels provided with an air chamber, the recess houses the thickened portion of the air chamber with which the inflation valve is associated, so as to ensure an optimal and uniform inflation of the tire. At the point in which the inflation valve is connected to the air chamber, the air chamber has a thickened portion, i.e. it has walls that have a reinforcing thickening. At the thickened portion there is a higher pressure of the air chamber against the tire than in the other areas, this pressure being able to even deform the shape of the tire. By using the aforementioned recess as housing seat for such a thickening, the pressure exerted on the tire can be made uniform. In this way, a high efficiency of operation of the wheel is obtained, as well as an optimal coupling between rim, air chamber and tire.

Preferably, the recess comprises, in a longitudinal plane of the rim, a curved bottom surface.

Alternatively, the recess, in a longitudinal plane of the rim, comprises a flat bottom surface.

In the case of a tubeless wheel, the flat bottom surface allows an excellent airtight coupling with a base surface, also substantially flat, of the head of the inflation valve. Moreover, in the case of a wheel with an air chamber, the flat bottom surface supports the thickened portion of the air chamber.

Preferably, the aforementioned recess comprises a bottom surface having an axial length between 6 and 12 mm. Even more preferably, the axial length of the recess is between 6.5 and 9.5 mm.

With the aforementioned values, holes can be made of a size such as to allow the passage of inflation valves for air chambers substantially of every type currently available on the market, without these air chambers deforming the tire. When an air chamber is used to temporarily repair a tubeless wheel, it is necessary for the relative inflation valve to be completely inserted in the hole, so that the inflated air chamber sits uniformly on the radially outer portion of the rim so as not to deform the tire. On the other hand, if the insertion of the valve in the hole were not complete, the air chamber would remain raised from the radially outer portion of the rim at the inflation valve, making the transversal profile of the tire mounted on the rim not perfectly circular.

Preferably, the lowered central annular portion is connected to the side annular portions through respective surfaces that, in a transversal plane of the rim, are curved. Even more preferably, the aforementioned curved surfaces are defined, with respect to a longitudinal plane of the rim, by curved generatrices.

Due to the provision of the curved surfaces, the assembly of the tire, and in particular the sliding of the radially inner end edges of the tire from the central annular portion towards the respective seats for holding such edges, arranged at the aforementioned side annular portions, is simplified.

Preferably, the rim further comprises a radially inner annular portion connected to the radially outer annular portion, the radially outer portion and the radially inner portion forming a substantially tubular structure. The radially outer ends of the spokes of the wheel are preferably connected to a plurality of respective holes defined in the radially inner portion of the rim, so that on the radially outer portion of the rim just the hole for the inflation valve is provided and it is not necessary to worry about the airtight seal at other holes.

Preferably, the radially inner portion of the rim is connected to the radially outer portion through two substantially radial side walls.

In a second aspect thereof, the present description relates to a bicycle wheel comprising a rim of the type described above.

Preferably, such a wheel has, individually or in combination, all of the structural and functional characteristics discussed above with reference to the aforementioned rim.

In an embodiment thereof, the wheel comprises a tire mounted on the radially outer portion of the rim and an air chamber operatively arranged between the radially outer portion and the tire. In this case, preferably, the wheel comprises an inflation valve associated with a thickened portion of the air chamber and passing through the respective hole suitably provided in the rim.

In a further embodiment, the wheel comprises a tire mounted airtight on the radially outer portion of the rim. In this case, preferably, the wheel comprises an inflation valve passing through the respective hole suitably provided in the rim, such an inflation valve comprising a widened head adapted to close the hole in an airtight manner.

Preferably, the widened head comprises at least one side surface in abutment with a corresponding abutment surface defined in the second surface discontinuity of the radially outer portion of the rim.

A reliable airtight assembly of the valve in the hole of the radially outer portion of the rim is thus ensured. Due to the abutment surface, it is possible to prevent rotation or movement of the valve during assembly, so that the risk of the valve being arranged in the hole in such a way as to break the seal is avoided.

Preferably, the radially outer portion of the rim comprises a bottom wall comprising a recess at the hole for the inflation valve.

In the case of a tubeless wheel, the widened head of the inflation valve is preferably housed in the recess. A limited hindrance to the insertion of the tire on the rim in the initial assembly steps of the tire is achieved.

In the case of a wheel with an air chamber, the recess preferably houses the thickened portion of air chamber. Therefore, optimal and uniform inflation of the tire is achieved.

Preferably, the inflation valve comprises a locking ring nut in abutment with a radially inner surface of the rim.

The ring nut is generally screwed onto a stem of the valve until the valve is locked on the rim once the ring nut is in abutment with the radially inner surface of the rim.

In the case of a tubeless wheel, any possible rotation of the valve about its own axis during the screwing of the ring nut is prevented, so that the airtight assembly of the valve on the rim is extremely simple, fast and effective.

On the other hand, in the case of a wheel with an air chamber, rotation of the thickened portion of the air chamber during the screwing of the ring nut is hindered so that the coupling between rim, air chamber and tire is optimal.

In a third aspect thereof, the present description relates to a bicycle comprising a wheel of the type described above.

Preferably, such a bicycle has, individually or in combination, all of the structural and functional characteristics discussed above with reference to the aforementioned wheel, and therefore has all of its advantages.

In a fourth aspect thereof, the present description relates to a method for manufacturing a rim for a bicycle wheel, comprising the steps of:
  providing a body shaped to form a tubular structure defined by a radially outer portion and a radially inner portion, the tubular structure being open at at least one of the two opposite ends thereof;
  forming a hole in the radially outer portion;
  inserting into the tubular structure, from one of the open ends thereof, an insert comprising a surface recess;
  positioning the insert so that the recess is located at the hole;
  imparting pressure with a punch to the radially outer portion at the hole;
  withdrawing the insert from one of the open ends of the tubular structure;
  connecting the two opposite ends of the body to form a closed ring.

Preferably, the method also comprises the steps of:
  forming a further hole in the radially inner portion, substantially at the hole in the radially outer portion;
  providing a cavity on a surface of the insert opposite the one in which the aforementioned recess is formed and inserting the insert into the tubular structure until the cavity is positioned at the further hole;
  inserting a pin into the further hole and into the cavity, before carrying out the step of imparting pressure with a punch to the radially outer portion of the body;
  withdrawing the pin from the cavity and from the further hole.

Preferably, the step of imparting pressure with a punch to the radially outer portion of the rim comprises a prior step of exerting a pressure on the pin, so as to keep the insert pushed against an inner surface of the radially outer portion of the rim, in particular during the action of the punch. In this way, the drawing that is obtained in the radially outer portion of the rim, at the hole, exactly matches the transversal profile of the surface recess of the insert.

Preferably, the step of withdrawing the insert comprises the step of pulling a cable connected to the insert. In this way, the insert is easily withdrawn from the tubular structure.

Further characteristics and advantages of the disclosed devices shall become clearer from the following detailed description of preferred embodiments, made with reference to the attached drawings and given for indicating and not limiting purposes.

DETAILED DESCRIPTION

With initial reference to FIG. 1, a bicycle wheel is shown. Such a wheel is wholly indicated with 1.

The wheel 1 comprises a rim 5 connected to a hub 7 through a plurality of spokes 10 extending between the hub 7 and the rim 5. The wheel 1 also comprises an inflation valve 12 associated with the rim 5 and a tire 15 mounted on the rim 5.

The wheel 1, and therefore the rim 5, has a rotational axis X with respect to which the axial, radial and circumferential directions of the rim 5, to which reference is made throughout the present description and in the subsequent claims, are defined.

Figure 2:
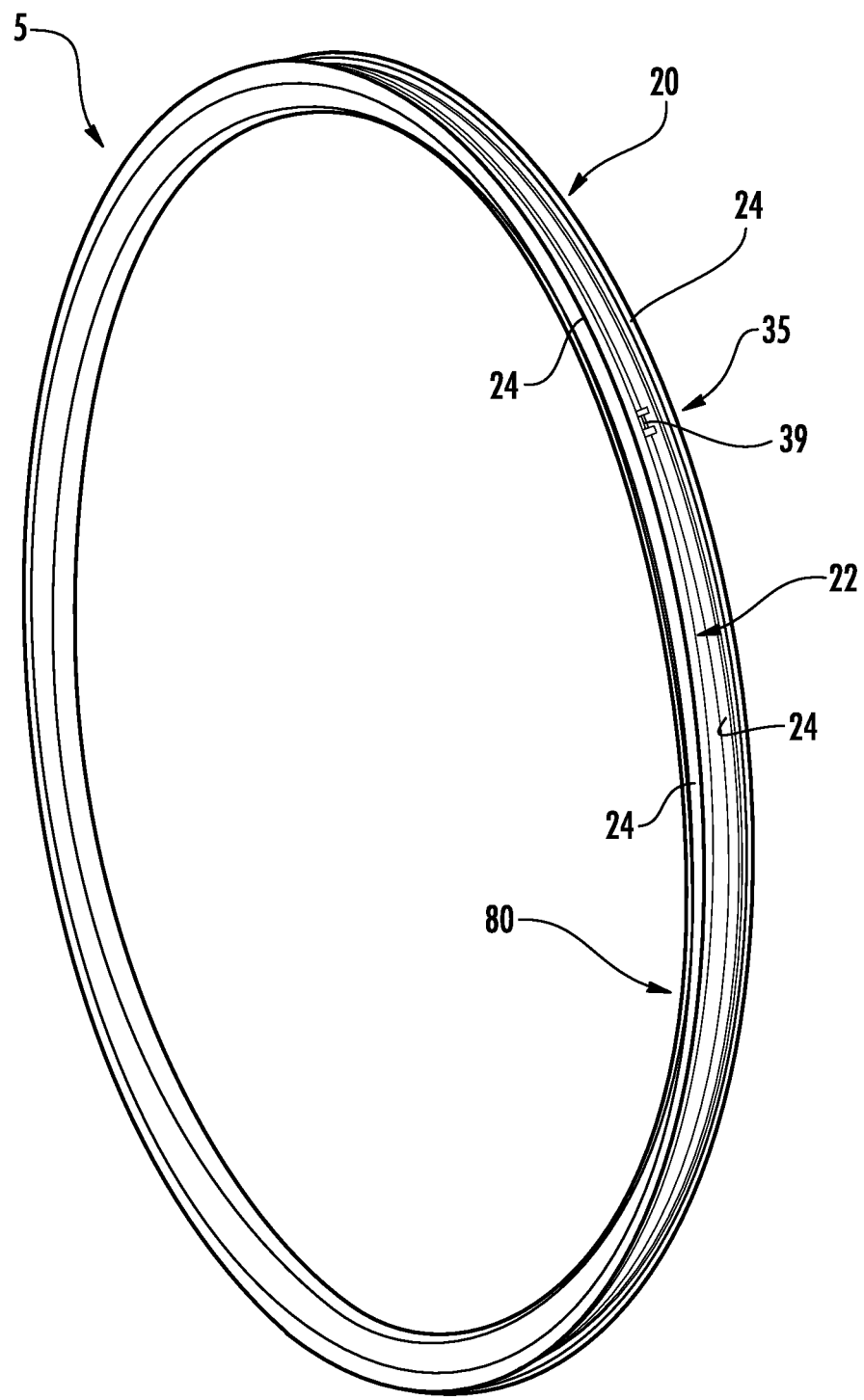
FIG. 2 schematically shows a perspective view of the rim of the wheel of FIG. 1.
Figure 3:
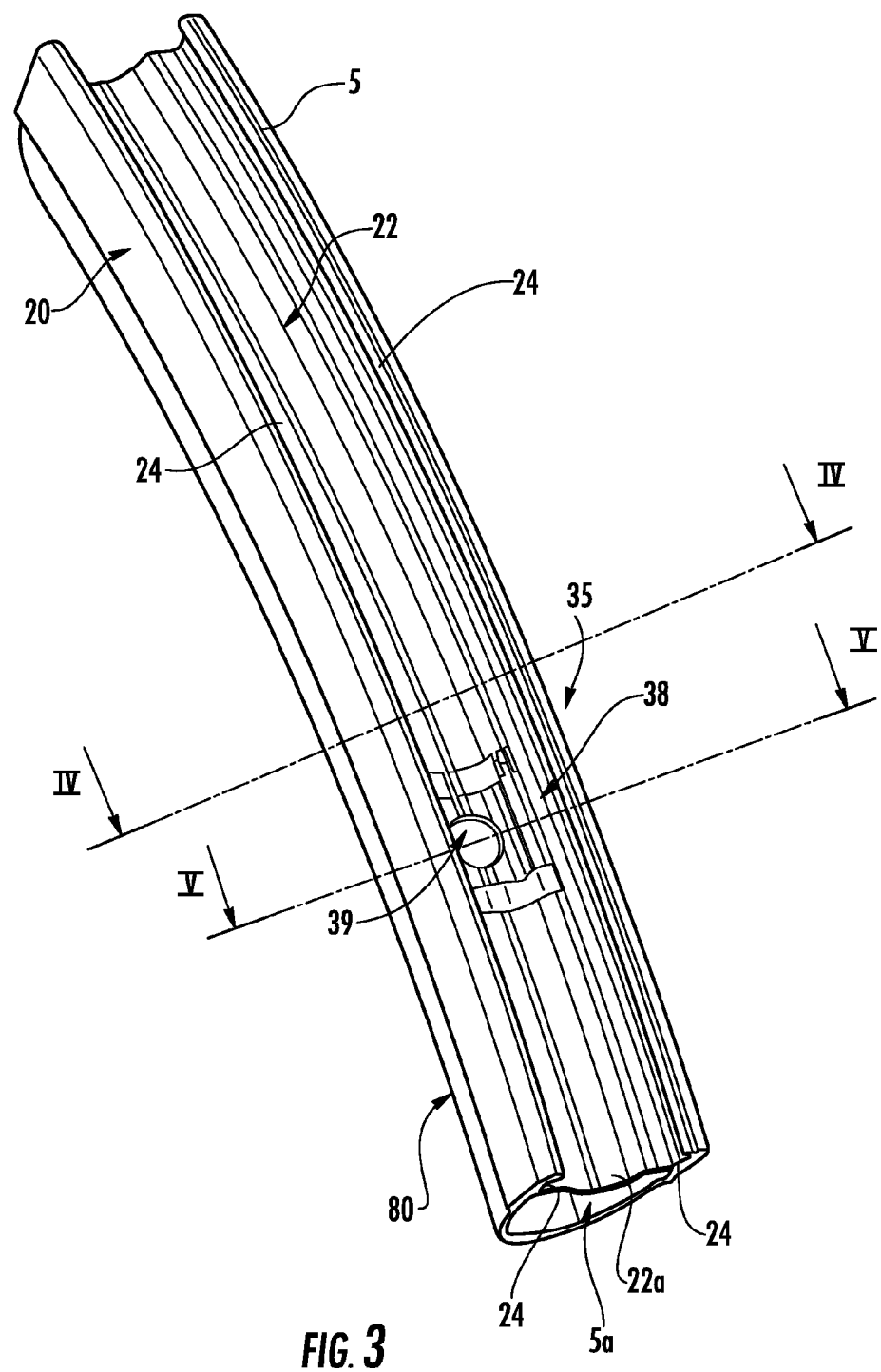
FIG. 3 schematically shows an enlarged view of a portion of the rim of FIG. 2.

With reference to FIGS. 2 and 3, the rim 5 comprises a body 20 with a substantially annular extension. The body 20 is shaped to house and hold, in a final assembled configuration of the tire, radially inner end edges 32 of the tire 15 (FIG. 5), commonly known as beads. The body 20 is also shaped to make the assembly steps of the tire 15 easier, as shall be made clearer hereafter.

As better illustrated in FIG. 3, the body 20 comprises a radially outer portion 22 with which the tire 15 is adapted to be coupled and a radially inner portion 80 formed as a single piece with the radially outer portion 22. The radially inner portion 80 and the radially outer portion 22 form a tubular structure 5a of the rim 5. The arrangement of the radially inner portion 80 in the wheel 1 is particularly advantageous since it offers easy fastening areas for the spokes 10 of the wheel 1.

The radially outer portion 22 includes an annular bottom wall 22a, or upper bridge, and a pair of annular side walls 24, or fins, extending substantially in the radial direction outwards from the bottom wall 22a. The side walls 24 comprise a radially outer end portion 24a curved towards a plane of symmetry II (illustrated in FIG. 5) of the rim 5.

The bottom wall 22a is totally free of holes, apart from a hole 39 adapted to house the inflation valve 12 of the tire 15.

Figure 5:
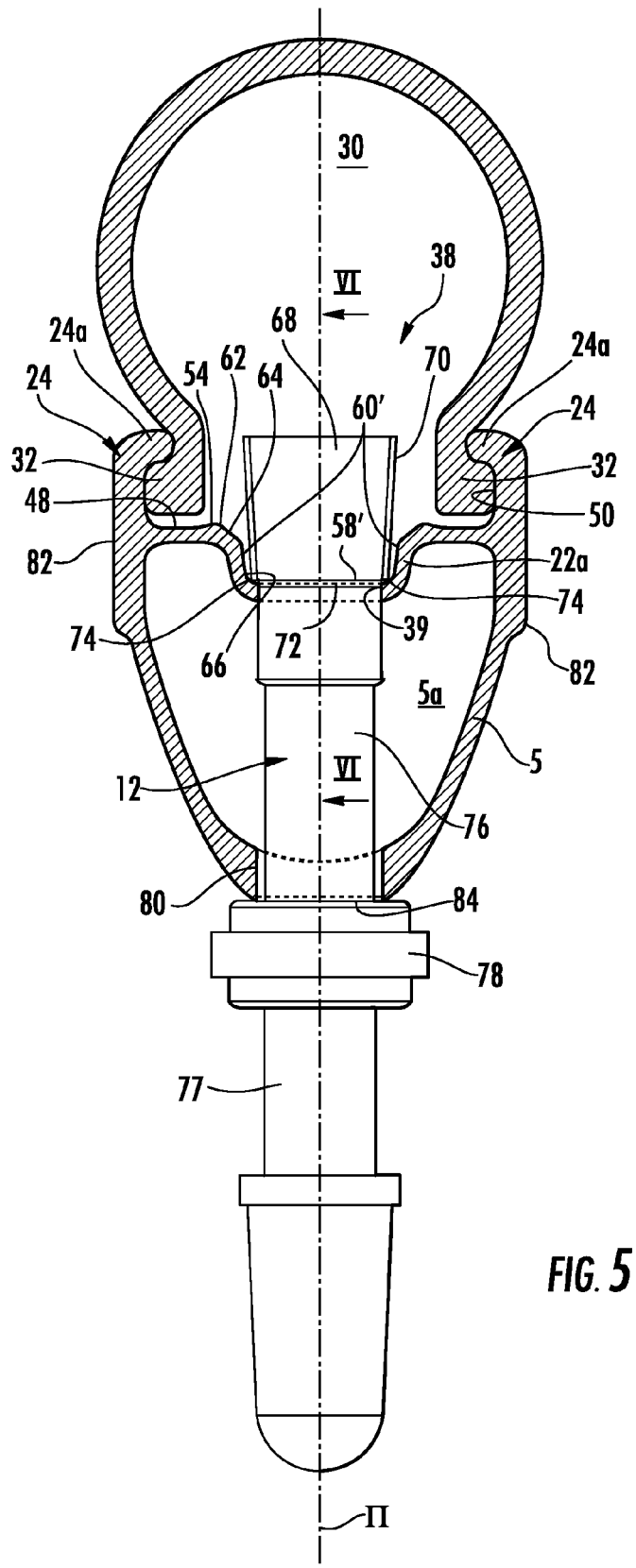
FIG. 5 schematically shows a cross sectional view of the portion of rim of FIG. 3, taken according to the plane V-V of FIG. 3, to which an inflation valve and a tire have been added in a final assembled configuration.

FIG. 5 shows how the side walls 24 cooperate with the tire 15 and with the bottom wall 22a to form an airtight chamber 30 between them. The side walls 24, and in particular the radially outer end portions 24a thereof, hold the tire 15 in the final assembled configuration counteracting the thrust of the pressurized air on the tire 15, to generate an airtight coupling.

Referring back to FIG. 2, the body 20 has an annular configuration with a uniform cross section along nearly the entire annular extension thereof. The uniformity is interrupted by the hole 39 for the inflation valve 12, which constitutes a first surface discontinuity of the bottom wall 22a, as well as by a second surface discontinuity 35 of the bottom wall 22a, more clearly visible in the enlargement of FIG. 3 and arranged near the hole 39.

In particular, the discontinuity 35 comprises a recess 38, substantially at the center of which the hole 39 is formed. The recess 38 is adapted to house a widened head 68, for example of a quadrangular shape, of the valve 12, so that a side surface of the head 68 abuts a corresponding side surface of the recess 38, so as to make the correct positioning of the valve 12 in the hole 39 easier.

Figure 4:
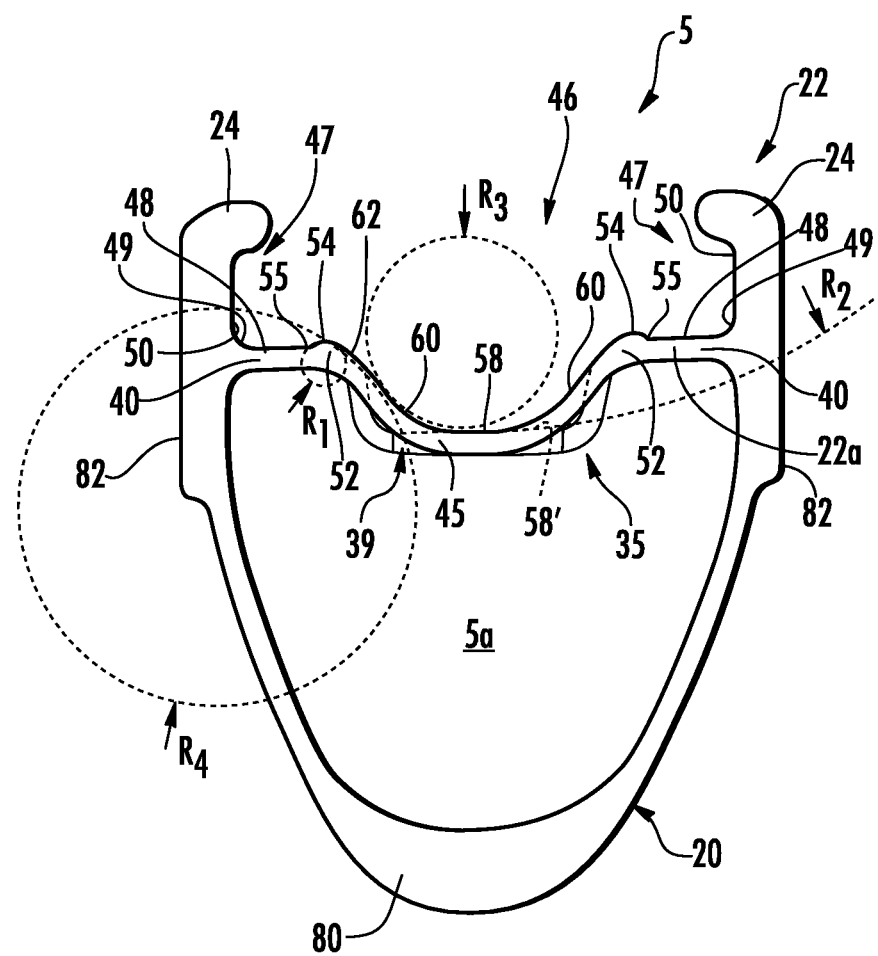
FIG. 4 schematically shows a cross sectional view of the portion of rim of FIG. 3, taken according to the plane IV-IV of FIG. 3.

FIG. 4, which is a section of the rim 5 according to the radial plane IV-IV of FIG. 3, such a plane passing through the rotational axis X, shows the transversal profile of the bottom wall 22a in the foreground, and in the background, with a broken line, the recess 38 for the head 68 of the valve 12. From FIG. 4 it is immediately clear how the discontinuity 35 extends over just a central portion 45 of the bottom wall 22a.

The bottom wall 22a comprises two side annular portions 40, arranged adjacent to the two annular side walls 24, and a central annular portion 45, arranged between the two side portions 40 and closer in the radial direction with respect to them, to the rotational axis X of the rim 5.

The central portion 45 defines a substantially annular channel 46 in which, in an initial assembly step of the tire 15, at least one of the radially inner end edges 32 of the tire is housed. Preferably, the central portion 45 is connected to the two side portions 40 through surfaces—which, in a transversal plane of the rim (or in a radial plane), are curved, as shall be specified hereafter.

As illustrated in FIGS. 4 and 5, the side portions 40 and the side walls 24 define two respective seats 47 for housing the two opposite beads 32 of the tire 15, which are arranged here in a final assembled configuration of the tire.

As illustrated better in FIG. 4, each side portion 40 of the bottom wall 22a is connected to the central portion 45 through an annular connecting portion 52, having a radially outer size larger than the radially outer size of the side portions 40, and preferably shaped so as to form a rib. In the assembly step the bead 32 positioned in the channel 46 must go past the connecting portion 52 to gain access to the respective seat 47.

Hereafter, with reference to FIG. 4, a detailed description shall be given of the surfaces that define the bottom wall 22a and the side walls 24, conventionally considering as concave, convex or flat surfaces, those surfaces of revolution about the X axis, respectively with a concave, convex or straight generatrix line in a transversal section of the rim 5, made according to a radial plane passing through the rotational axis X, where the line is convex when the center of curvature of such a line is on the side of the rotational axis X, whereas the line is concave when the center of curvature is on the opposite side of the rotation axis X.

Each side portion 40 comprises a radially outer flat surface 48 orientated substantially parallel to the rotational axis X, whereas each side wall 24 comprises an axially inner flat surface 50 orientated substantially perpendicular to the rotational axis X. The flat surfaces 48 and 50 are connected a respective curved surface 49, having a small bending radius. The flat surfaces 48 and 50, together with the radially outer end portion of the side walls 24, delimit the seats 47 for housing the beads 32 of the tire 15.

Each connecting portion 52 comprises a convex surface 54 with a bending radius R1 (in FIG. 4 the circle with radius R1 is indicated with a broken line). The convex surface 54 is connected to the respective flat surface 48 through a concave joining surface 55, having a small bending radius.

The side of the central portion 45 of the bottom wall 22a orientated radially outward with respect to the rim is defined by a plurality of surfaces. In particular, it comprises a concave base surface 58 with a bending radius R2, two first concave side surfaces 60 with a bending radius R3, directly connected to the base surface 58, and two second convex side surfaces 62 with a bending radius R4, directly connected to the first concave surfaces 60 and to the convex surfaces 54. In FIG. 4, the arcs of the circles with radius R2, R3 and R4 are indicated in broken lines.

The radii, R1, R3, and R4 are each smaller than the radius R2.

The aforementioned joining surfaces with a small radii are understood to have a smaller radius than the radii R1, R3 and R4, as well as than the radius R2.

Preferably, the radius R3 is smaller than R4.

Even more preferably, the radius R1 is smaller than R3.

Alternatively, the bottom surface 58 can be flat, or have a generatrix line that is straight and parallel to the rotational axis X.

Alternatively, the bottom surface 58 can be absent. In this case, the first side surfaces 60 are directly connected together.

With reference to FIGS. 4 and 5, the section of the bottom wall 22a, taken according to the plane V-V of FIG. 3, at the recess 38, differs from the section of the bottom wall 22a that is not at the recess 38 (for example from the section of the bridge taken according to the plane IV-IV of FIG. 3), only in the area of the channel 46. At the recess 38, the bottom of the channel 46 is longer in the axial direction that it is in areas of the rim 5 that are not at the recess 38, as illustrated in FIG. 4.

In particular, at the recess 38, the bottom of the channel 46 is defined by a bottom surface 58', where the hole 39 is made, which has a substantially flat shape.

Moreover, at the recess 38, the sides of the channel 46 are defined by first flat side surfaces 60' (FIG. 5), unlike the concave surfaces 60. The first side surfaces 60' are connected to the second side surfaces 62 and to the bottom surface 58' through respective joining surfaces, in particular a convex surface 64 and a concave surface 66, having a small bending radius. The first side surfaces 60' are inclined with respect to the plane of symmetry n of the rim 5, so as to form a flaring in the recess 38.

The head 68 of the valve 12 is elastic and has two opposite flat walls 70 that are flared with a smaller inclination than that of the first side surfaces 60'. The base surface 72 of the head 68 of the valve 12 is adapted to abut the base surface 58', but it is of a slightly greater axial length than the base surface 58', so that during the insertion of the valve 12 in the hole 39, two opposite sides 74 of the base surface 72 slide on the first side surfaces 60' until the head 68 is compressed to completely enter into the recess 38 and ensure an airtight coupling around the hole 39 for the inflation valve 12.

The valve 12 also comprises a threaded stem 76 extending from the elastic head 68. The stem 76 is adapted to be inserted into the hole 39 and is of a sufficient length to span the entire cross section of the rim 5 and permit a free end 77 to project therefrom in the radial direction towards the center of the rim 5. A locking ring 78 is screwed onto the free end 77 and is locked in abutment against a radially inner surface 84 of the radially inner portion 80 of the rim 5 to lock the base surface 72 of the head 68 against the bottom surface 58' of the rim 5.

FIG. 5 shows a condition in which the head 68 of the valve 12 is not yet completely in abutment with the bottom surface 58', this condition being reached by screwing the ring nut 78 further than what has been illustrated to elastically deform the head 68 and align the end surface of the head 68 with the bottom surface 58'.

Figure 6:
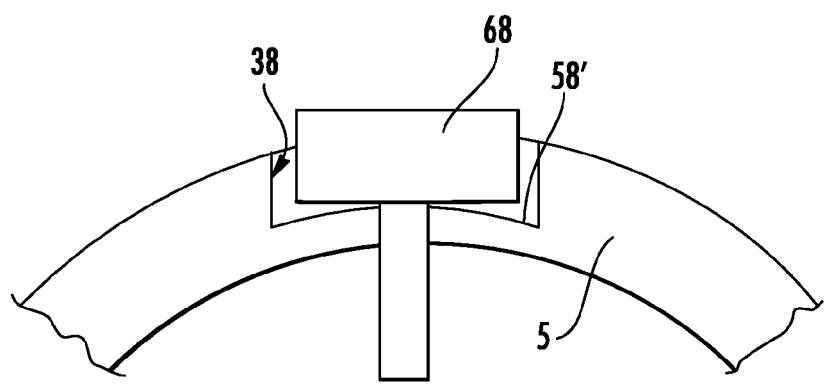
FIG. 6 schematically shows a longitudinal sectional view of the rim of FIG. 5, taken according to the plane VI-VI of FIG. 5.

FIG. 6, which illustrates a section of the rim 5 according to the plane of symmetry π, shows how the bottom surface 58' of the recess 38 is a surface of revolution that extends circumferentially.

Figure 7:
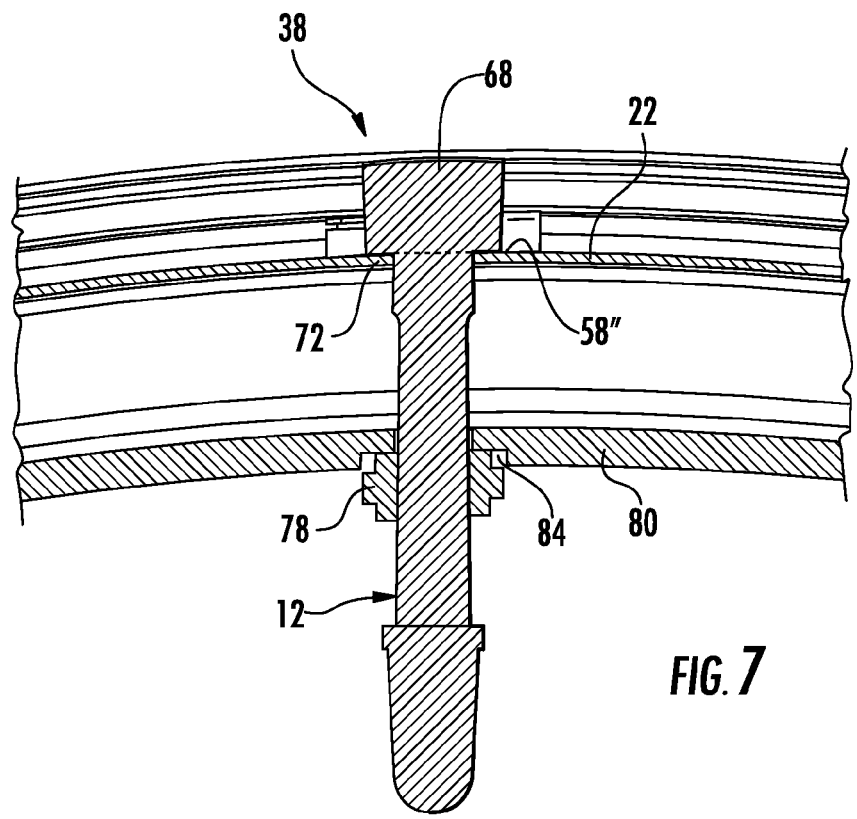
FIG. 7 schematically shows a longitudinal sectional view of a portion of a second embodiment of a bicycle wheel, such a view being analogous to that of FIG. 6.

FIG. 7 shows a second embodiment of the bicycle wheel. In FIG. 7, structural elements that are identical or equivalent from the functional point of view to those of the wheel 1 described above with reference to FIGS. 1-6 shall be indicated with the same reference numerals and shall not be described any further.

In particular, the embodiment of FIG. 7 differs from that of FIGS. 1-6 in that the bottom surface 58" of the recess 38 is flat in the circumferential direction, unlike the bottom surface 58' which, with respect to a longitudinal plane of symmetry of the rim, is defined by curved generatrices. Advantageously, the flat bottom surface 58" allows an excellent airtight coupling with the base surface 72, also substantially flat, of the head 68 of the valve 12.

As can be seen more clearly in FIG. 5, the radially inner portion 80 of the rim 5 is connected to the radially outer portion 22 by two substantially radially oriented side walls 82, thus forming the aforementioned tubular structure 5a of the rim 5. The surface 84 of the radially inner portion 80 is preferably flat and parallel to the rotational axis X. Even more preferably, the surface 84 of the radially inner portion 80 is also flat in the circumferential direction, such as is illustrated in the embodiment of FIG. 7, so that the ring nut 78 can impart on the head 68 of the valve 12 the same force along the entire surface of the base 72, in this way ensuring a substantially uniform contact of the base 72 at each point of the base surface 58' around the hole 39. In such a condition, the head 68 makes an optimal airtight seal around the hole 39.

Figure 8:
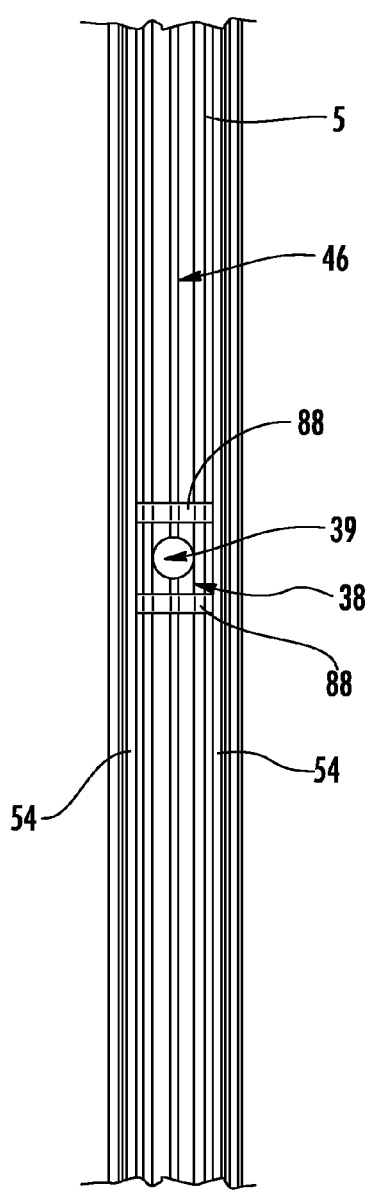
FIG. 8 schematically shows a plan view from above of the portion of rim of FIG. 3.

FIG. 8 is a view from above of the portion of rim 5 illustrated in FIG. 3 that shows how the recess 38 is connected to the remaining part of the channel 46 through circumferential joining surfaces 88.

Preferably, the length in the axial direction of the base surface 58' is between 6 and 12 mm, and even more preferably between 6.5 and 9.5 mm, so as to permit housing of holes of a size such as to allow the passage of inflation valves of every type, in particular those commonly available on the market.

Figure 9:
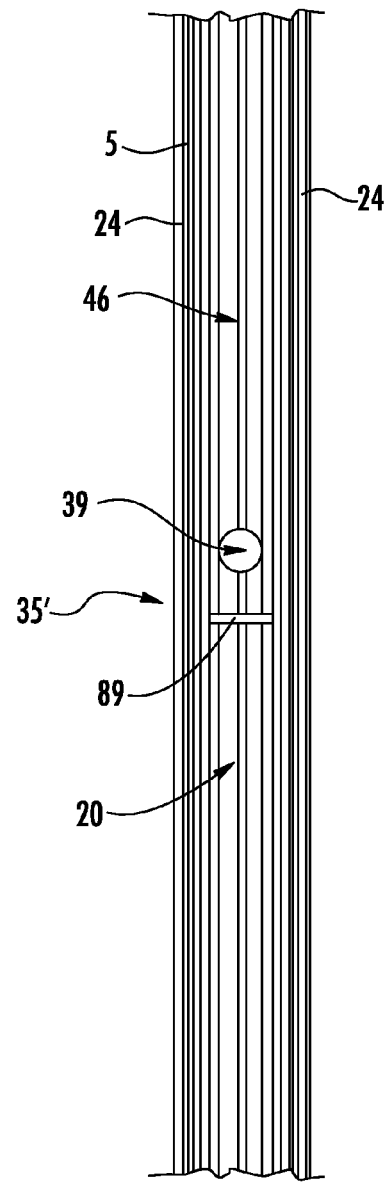
FIG. 9 schematically shows a plan view from above of a portion of rim of a third embodiment of a bicycle wheel, such a view being analogous to that of FIG. 8.

FIG. 9 shows a third embodiment of the bicycle wheel. In FIG. 9, structural elements that are identical or equivalent from the functional point of view to those of the wheel 1 described above with reference to FIGS. 1-6 and 8 shall be indicated with the same reference numerals and shall not be described any further.

In this embodiment of the wheel, the body 20 of the rim 5 has a surface discontinuity 35' defined by an abutment surface 89 extending transversally in the channel 46. The abutment surface 89, preferably of substantially flat shape, is close enough to the hole 39 to provide a side abutment for a corresponding side surface of the head 68 of the inflation valve 12. The abutment surface 89 shown in FIG. 9 is perpendicular to the side walls 24, but other orientations of the abutment surface 89 are contemplated as well. Moreover, the aforementioned second discontinuity could also be arranged only at the hole 39, such as between the hole 39 and a side wall 24.

In use, the aforementioned discontinuities 35 and 35' are particularly useful for preventing the head 68 of the valve 12 from rotating with respect to the recess 38 about a longitudinal axis of the valve and positioning itself so as to compromise the airtight connection around the hole 39 during the screwing of the ring nut 78 of the inflation valve 12.

The curved surfaces of the central portion 45 of the body 20 are useful in an initial assembly step of the tire 15, when a bead 32 is inserted into the channel 46 and is thrust by the pressure of the air towards the side walls 24. The curved surfaces are adapted to facilitate sliding of the bead 32 and movement thereof beyond the connecting surface 54, during the inflation of the tire 15.

The rim 5 can be made from any material, for example metal, such as an aluminum alloy. In combination with or as an alternative to the metallic material, it is possible to use a structural composite material.

Composite material is defined as a material consisting of at least two components including a polymeric matrix and a filler such as one comprising structural fibers, granules or powders. The structural fibers are preferably selected from the group consisting of carbon fibers, glass fibers, aramid fibers, ceramic fibers, boron fibers and combinations thereof. Carbon fibers are particularly preferred. Preferably, the polymeric material is thermosetting and preferably comprises an epoxy resin. However, the use of a thermoplastic material is not excluded.

Structural composite materials are defined as those materials that contain structural fibers with a length of over five millimeters. The arrangement of the structural fibers in the polymeric material can be a random arrangement of pieces or sheets of structural fibers, a substantially unidirectional ordered arrangement of fibers, a substantially bi-directional ordered arrangement of fibers or a combination of the above.

Figure 10:
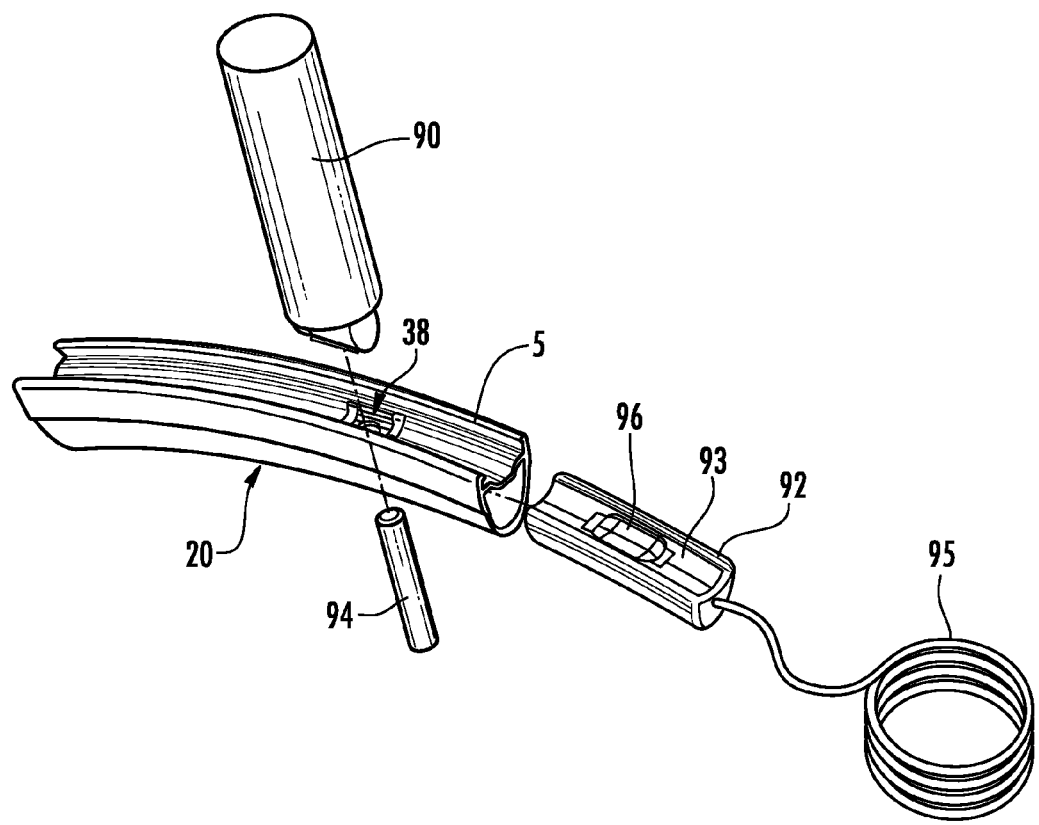
FIGS. 10 and 11 schematically show perspective views of the portion of rim of FIG. 3, and an apparatus used for manufacturing a part of such a rim.
Figure 11:
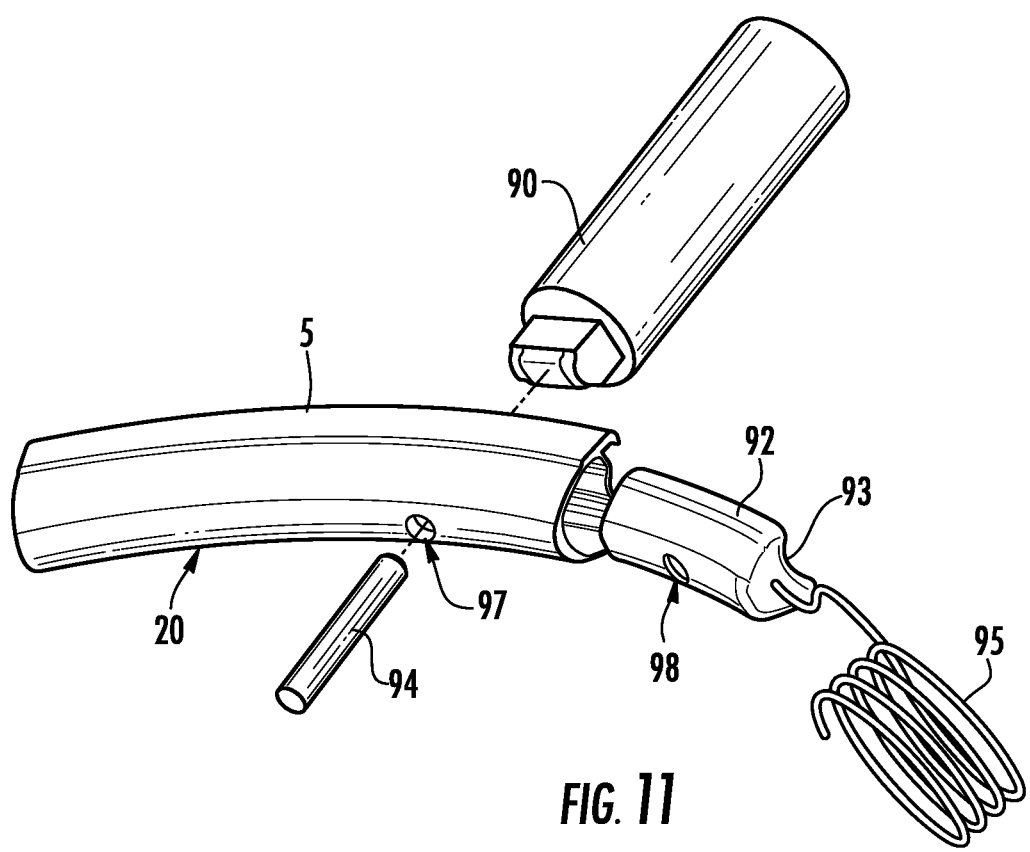

With reference to FIGS. 10 and 11, an apparatus used to form the recess 38 in a metal rim 5 is shown.

Such an apparatus comprises a punch 90 shaped according to the transversal profile of the recess 38, a insert 92, comprising an upper surface 93 shaped according to the lower transversal profile of the bottom wall 22a of the rim 5, a pin 94 and a cable 95.

Figure 12:
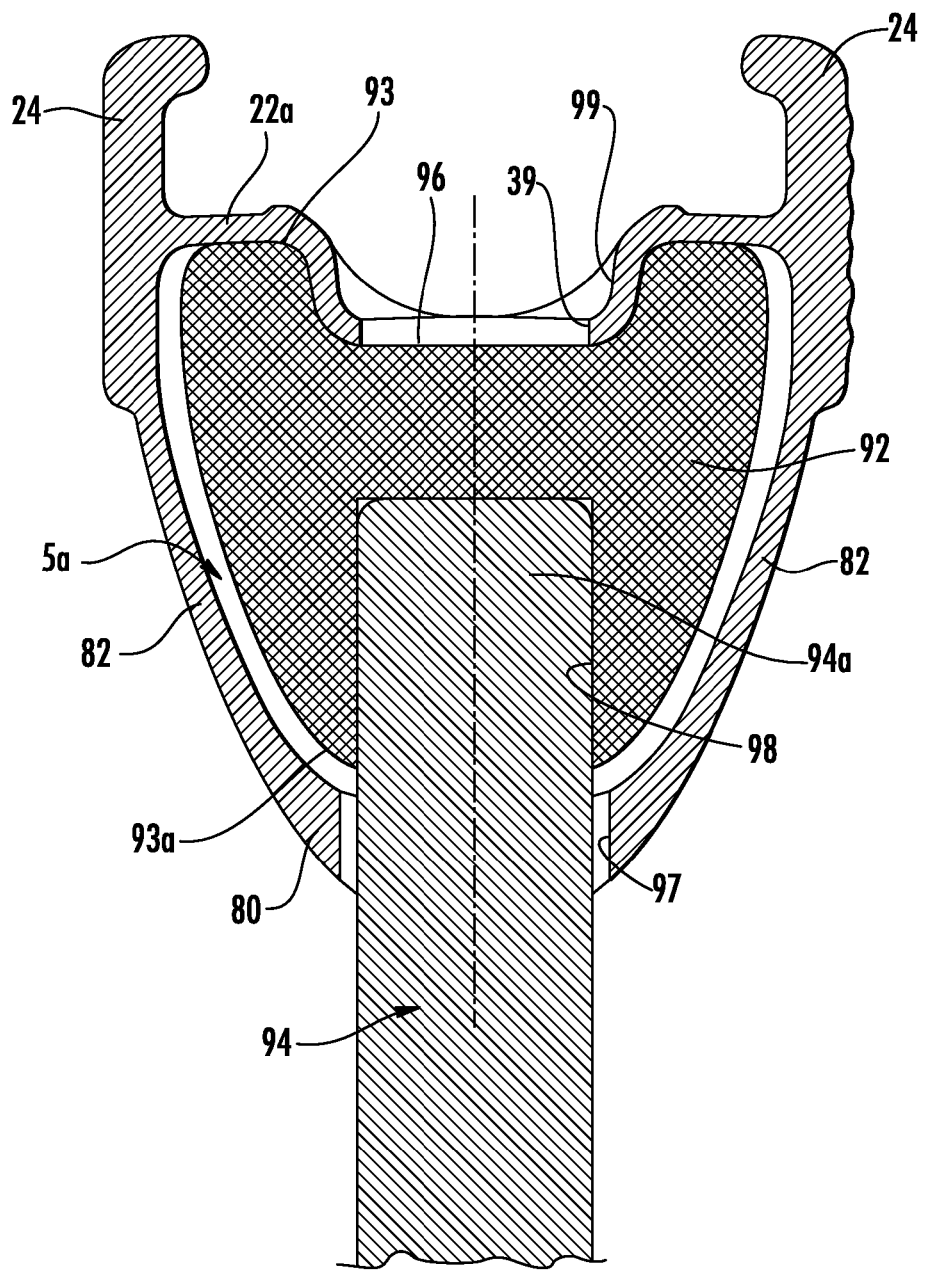
FIGS. 12 and 13 schematically show a cross sectional view of a portion of rim and of part of the apparatus of FIGS. 10 and 11, in successive steps for manufacturing the part of such a rim.

As can be seen more clearly in FIG. 12, the insert 92 is smaller in size than the tubular structure 5a of the rim 5, in particular it has a smaller width and height than the tubular structure 5a, so as to permit sliding inside the tubular structure 5a created by the bottom wall 22a, the radially inner portion 80 and the walls 82.

Moreover, the insert 92, on the upper surface 93 thereof, has a recess 96 that is shaped according to the lower transversal profile of the recess 38 to be obtained on the bottom wall 22a. The lower surface 93a of the insert 92 also has a cavity 98 of a size adapted to house an end 94a of the pin 94.

In a first operational step, a body 20 having a substantially rectilinear extension and shaped to form the aforementioned tubular structure 5a, for example through extrusion or calendaring, is arranged. Such a body 20 is then cut to a size substantially corresponding to the circumferential length of the rim 5 to be manufactured.

The forming of the recess 38 on the bottom wall 22a of the aforementioned body comprises the following processing steps.

First, a first hole 97 is made in the radially inner portion 80 of the body 20. From one of the open ends of the body 20 the insert 92 is inserted into the tubular structure 5a and it is made to slide until the pin 94 can be inserted into the cavity 98, after having crossed the hole 97. In this way, the insert 92 is positioned in the area in which the recess 38 must be made.

At this point, the insert 92 is kept pressed through the pin 94 against the lower surface of the bottom wall 22a of the radially outer portion 22 of the body 20 and simultaneously the upper surface of the bottom wall 22a is compressed from the outside by the punch 90, so that a portion 99 of the bottom wall 22a is drawn, penetrating into the recess 96 of the insert 92.

Figure 13:
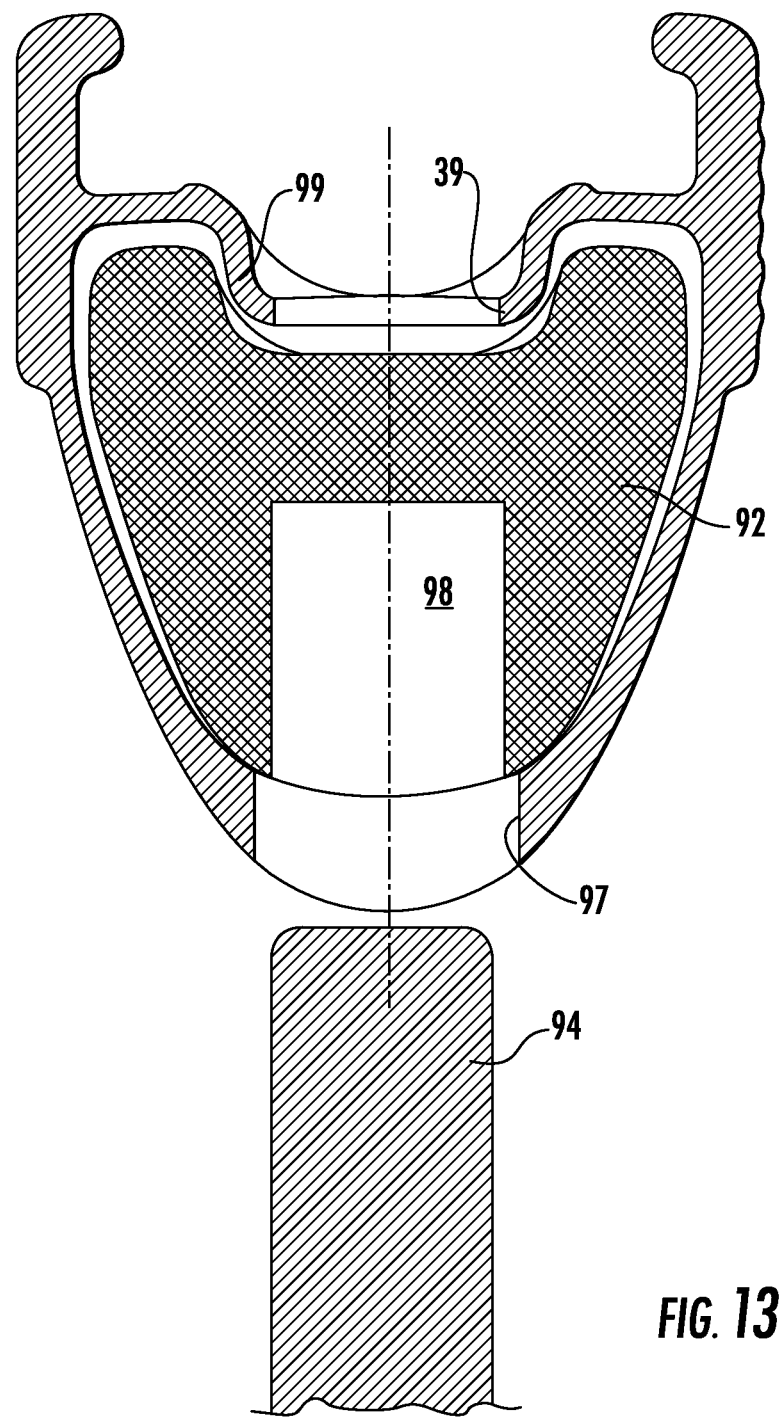

By withdrawing the pin 94, the insert 92 falls back by gravity into the tubular structure 5a towards the radially inner portion 80, as shown in FIG. 13. As a result, the drawn portion 99 comes out from the recess 96 of the insert 92. It is thus possible to withdraw the insert 92 by pulling the cable 95, which is laterally connected to the insert 92. Other withdrawing means can be used, such as a magnet through which it is possible to draw a metallic insert until it comes out from the body 20, the magnet being maneuvered to the outside of the body 20.

Finally, the opposite open ends of the body 20 are connected to form a closed loop, so as to make the rim 5.

The hole 39 on the bottom wall 22a of the radially outer portion 22 of the body 20 can be made before or after the drawing of the portion 99. Preferably, as is shown in FIGS. 12 and 13, the hole 39 is made before the drawing.

A person of ordinary skill in the art can bring numerous modifications and variants to the rim for a bicycle wheel, to the wheel and to the method for manufacturing the rim described above, in order to satisfy specific and contingent requirements, all of which are moreover comprised within the scope of protection of the following claims.

What is claimed is:

1. A rim for a bicycle wheel comprising a body with a substantially continuous annular extension having a radially outer portion shaped for the coupling with a tire, said radially outer portion comprising a hole for an inflation valve having a widened head, said hole constituting a first surface discontinuity along the substantially continuous annular extension of said radially outer portion, wherein said radially outer portion comprises, in an area proximal to said hole, at least one cross section having a different cross section from that at an area distal from said hole, so that the at least one cross section forms at least one second surface discontinuity along the substantially continuous annular extension of said radially outer portion, wherein said at least one second surface discontinuity prevents the rotation of said inflation valve about its own longitudinal axis through contact with said widened head.

2. The rim of claim 1 wherein said radially outer portion has the same cross section along the entire annular extension of said body with substantially annular extension, apart from at least one of said area at said hole or said area proximal to said hole.

3. The rim of claim 1 wherein said radially outer portion comprises an annular bottom wall extending in the axial direction and a pair of opposite annular side walls extending radially outwards from said bottom wall, said side walls comprising radially outer end portions for holding respective radially inner end edges of the tire.

4. The rim of claim 3 wherein said bottom wall comprises a central annular portion and two opposite side annular portions, said central annular portion being radially lowered with respect to said opposite side annular portions.

5. The rim of claim 1 wherein said rim is a rim for a tubeless wheel.

6. The rim of claim 1 wherein said rim is a rim for a wheel provided with an air chamber, and wherein said at least one second surface discontinuity is adapted to come into contact with a portion of the air chamber with which said inflation valve is associated when said inflation valve is inserted in said hole, wherein the portion of the air chamber has a thickened wall.

7. The rim of claim 5 wherein said at least one second surface discontinuity comprises at least one abutment surface for at least one side surface of said inflation valve, when said inflation valve is mounted on said body with substantially annular extension.

8. The rim of claim 7 wherein said at least one abutment surface is a substantially flat surface.

9. The rim of claim 7 wherein said at least one abutment surface extends radially outwards from said bottom wall between opposite first and second annular side walls.

10. The rim of claim 9 wherein said at least one abutment surface extends perpendicularly to said side walls.

11. The rim of claim 3 wherein said bottom wall comprises, at said hole, a recess.

12. The rim of claim 4 wherein said bottom wall comprises, at said hole, a recess and said recess is made in said radially lowered central annular portion.

13. The rim of claim 7 wherein said bottom wall comprises, at said hole, a recess and said at least one abutment surface is defined by a side wall of said recess.

14. The rim of claim 11 wherein said recess comprises, in a longitudinal plane of the rim, a curved bottom surface.

15. The rim of claim 11 wherein said recess comprises, in a longitudinal plane of the rim, a flat bottom surface.

16. The rim of claim 11 wherein said recess comprises a bottom surface having an axial length between 6 and 12 mm.

17. The rim of claim 16 wherein said axial length is between 6.5 and 9.5 mm.

18. The rim of claim 4 wherein said lowered central annular portion is connected to said side annular portions through respective surfaces that, in a transversal plane of the rim, are curved.

19. The rim of claim 18 wherein said curved surfaces are defined, with respect to a longitudinal plane of the rim, by curved generatrices.

20. The rim of claim 1 wherein said body with substantially annular extension comprises a radially inner annular portion connected to said radially outer annular portion, said radially outer portion and said radially inner portion forming a substantially tubular structure.

21. The rim of claim 20 wherein said radially inner portion is connected to said radially outer portion through two substantially radial side walls.

22. A bicycle wheel comprising a rim, the rim comprising a body with a substantially continuous annular extension having a radially outer portion shaped for the coupling with a tire, said radially outer portion comprising a hole for an inflation valve having a widened head, said hole constituting a first surface discontinuity along the substantially continuous annular extension of said radially outer portion, wherein said radially outer portion comprises, in an area proximal to said hole, at least one cross section having a different cross section from that at an area distal from said hole, so that the at least one cross section forms at least one second surface discontinuity along the substantially continuous annular extension of said radially outer portion, wherein said at least one second surface discontinuity prevents the rotation of said inflation valve about its own longitudinal axis through contact with said widened head.

23. The wheel of claim 22 comprising a tire mounted on said radially outer portion of said rim and an air chamber operatively arranged between said radially outer portion and said tire.

24. The wheel of claim 23, comprising an inflation valve associated with a portion of said air chamber and passing through said hole of said rim, wherein the portion of the air chamber has a thickened wall.

25. The wheel of claim 22 comprising a tire mounted airtight on said radially outer portion of said rim.

26. The wheel of claim 25 comprising an inflation valve passing through said hole of said rim, said inflation valve comprising a widened head adapted to close airtight said hole.

27. The wheel of claim 26 wherein said widened head comprises at least one side surface in abutment with a corresponding abutment surface defined in said at least one second surface discontinuity of said radially outer portion of said rim.

28. The wheel of claim 22 wherein said radially outer portion of said rim comprises an annular bottom wall and wherein said annular bottom wall comprises a recess at said hole.

29. The wheel of claim 26 wherein said widened head comprises at least one side surface in abutment with a corresponding abutment surface defined in said at least one second surface discontinuity of said radially outer portion of said rim, said radially outer portion of said rim comprises an annular bottom wall, said annular bottom wall comprises a recess at said hole, and said widened head is housed in said recess.

30. The wheel of claim 24 wherein said inflation valve comprises a widened head comprising at least one side surface in abutment with a corresponding abutment surface defined in said at least one second surface discontinuity of said radially outer portion of said rim, said radially outer portion of said rim comprises an annular bottom wall, said annular bottom wall comprises a recess at said hole, and said widened head is housed in said recess, and said portion of the air chamber is housed in said recess.

31. The wheel of claim 26 wherein said inflation valve comprises a locking ring nut in abutment on a radially inner surface of said body with substantially annular extension.

32. A bicycle comprising a wheel, the wheel comprising a rim, the rim comprising a body with a substantially continuous annular extension having a radially outer portion shaped for the coupling with a tire, said radially outer portion comprising a hole for an inflation valve having a widened head, said hole constituting a first surface discontinuity along the substantially continuous annular extension of said radially outer portion, wherein said radially outer portion comprises, in an area proximal to said hole, at least one cross section having a different cross section from that at an area distal from said hole, so that the at least one cross section forms at least one second surface discontinuity along the substantially continuous annular extension of said radially outer portion, wherein said at least one second surface discontinuity prevents the rotation of said inflation valve about its own longitudinal axis through contact with said widened head.

33. A bicycle wheel rim having an annular tubular body comprising a radially outer upper bridge and a pair of annular side walls extending radially outward from respective axial sides of the upper bridge, the upper bridge and annular side walls being configured for coupling with a tire to form an airtight connection, wherein the upper bridge defines at least one surface discontinuity proximate to a hole for receiving an inflation valve having a widened head, wherein the at least one surface discontinuity comprises a recess that prevents the rotation of said inflation valve about its own longitudinal axis through contact with said widened head.

34. The rim of claim 33 wherein the hole is defined within the recess.

35. The rim of claim 33 wherein the rim rotates about a radially central axis of rotation and is symmetrical about a plane of symmetry that is perpendicular to the axis of rotation.

36. The rim of claim 35 wherein the upper bridge defines a central annular channel, and the at least one surface discontinuity is defined within the channel.

37. The rim of claim 36 wherein the upper bridge further comprises two outer side surfaces on opposite axial sides of the channel and oriented parallel to the central axis of rotation.

38. The rim of claim 37 wherein the outer side surfaces are connected to the channel by respective connecting portions having radially outer concave surfaces of a first bending radius.

39. The rim of claim 37 wherein the channel, in an area separate from the at least one surface discontinuity, has a curved section according to a plane passing through the central axis of rotation.

40. A bicycle wheel comprising a rim having an annular tubular body, symmetrical about a plane of symmetry that is perpendicular to an axis of rotation of the wheel, the body being defined by first and second annular side walls connecting a radially inner portion and radially outer portion, the radially outer portion comprising an outer bridge and first and second annular side walls extending radially outward from respective axial sides from the radially outer portion and comprising end portions curved inward with respect to the plane of symmetry to define two seats for housing a respective bead of a tubeless tire, wherein the rim comprises at least one surface discontinuity proximate to a hole that receives an inflation valve having a widened head, wherein the at least one surface discontinuity comprises a recess that prevents the rotation of said inflation valve about its own longitudinal axis through contact with said widened head.

41. The wheel of claim 40 wherein the hole is defined within the recess.

42. A rim for a bicycle wheel comprising an annular tubular body having a radially outer portion that couples with a tubeless tire, the radially outer portion comprising a hole that receives an inflation valve having a widened head and a longitudinal axis, and an outer bridge comprising a recess that extends in the circumferential direction of the radially outer portion, wherein the hole is defined within the recess, and the recess is shaped to prevent rotation of the inflation valve about the longitudinal axis through contact with said widened head.

43. The rim of claim 42 wherein the upper bridge comprises a central annular channel, and the recess is defined within the channel.

* * * * *